(12) United States Patent
Zombo et al.

(10) Patent No.: US 9,015,002 B2
(45) Date of Patent: Apr. 21, 2015

(54) SYSTEM FOR MONITORING A HIGH-TEMPERATURE REGION OF INTEREST IN A TURBINE ENGINE

(75) Inventors: Paul J. Zombo, Cocoa, FL (US); Dennis H. Lemieux, Casselberry, FL (US); Clifford Hatcher, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 470 days.

(21) Appl. No.: 13/274,692

(22) Filed: Oct. 17, 2011

(65) Prior Publication Data

US 2012/0101769 A1 Apr. 26, 2012

Related U.S. Application Data

(60) Provisional application No. 61/405,377, filed on Oct. 21, 2010.

(51) Int. Cl.
*G01J 5/00* (2006.01)
*G01J 5/08* (2006.01)

(52) U.S. Cl.
CPC .............. *G01J 5/00* (2013.01); *G01J 5/0022* (2013.01); *G01J 5/0088* (2013.01); *G01J 5/08* (2013.01); *G01J 5/0821* (2013.01); *G01J 5/0859* (2013.01); *G01J 2005/0077* (2013.01)

(58) Field of Classification Search
CPC .......................................................... G01J 5/00
USPC .......................................................... 702/135
See application file for complete search history.

(56) References Cited

U.S. PATENT DOCUMENTS

| | | | |
|---|---|---|---|
| 3,623,368 A | 11/1971 | Decker, Jr. |
| 4,037,473 A | 7/1977 | Compton et al. |
| 4,777,567 A | 10/1988 | Welker et al. |
| 4,870,270 A | 9/1989 | Brennan |
| 6,091,489 A | 7/2000 | Welker |
| 6,109,783 A | 8/2000 | Dobler et al. |
| 6,153,889 A | 11/2000 | Jones |
| 6,422,743 B1 | 7/2002 | Nirmalan et al. |
| 6,570,175 B2 | 5/2003 | Bales et al. |
| 6,711,506 B2 | 3/2004 | Bales et al. |
| 6,796,709 B2 | 9/2004 | Choi |
| 6,992,315 B2 | 1/2006 | Twerdochlib |
| 7,432,505 B2 | 10/2008 | Brummel |
| 7,489,811 B2 | 2/2009 | Brummel et al. |
| 7,502,538 B2 | 3/2009 | Brummel et al. |
| 7,619,728 B2 | 11/2009 | Ogburn et al. |
| 7,632,012 B2 | 12/2009 | Twerdochlib |

(Continued)

FOREIGN PATENT DOCUMENTS

GB 2358059 A 7/2001
JP H11142247 A 5/1999

OTHER PUBLICATIONS

M. Willsch, T. Bosselmann, N.M. Theune, New approaches for the monitoring of gas turbine blades and vanes, 0-7803-8692-2/04 2004 IEEE, pp. 20-23, Erlangen, Germany.

*Primary Examiner* — Bryan Bui (57) ABSTRACT

A system (8) for monitoring a high-temperature region of interest in a turbine engine (10) is provided. The system includes an internally cooled stationary vane (12) located in a path of a working gas of the turbine. A monitoring port (14) is located in the stationary vane. A monitoring instrument (16) is operatively connected to the monitoring port of the stationary vane to provide a field of view of the region of interest.

16 Claims, 5 Drawing Sheets

(56) References Cited

U.S. PATENT DOCUMENTS

| | | |
|---|---|---|
| 7,633,066 B2 | 12/2009 | Antel, Jr. et al. |
| 7,689,003 B2 | 3/2010 | Shannon et al. |
| 7,690,840 B2 * | 4/2010 | Zombo et al. .................. 374/121 |
| 7,791,025 B2 * | 9/2010 | Key ............................... 250/332 |
| 8,439,630 B2 * | 5/2013 | Lemieux et al. ............... 415/118 |
| 8,768,646 B2 * | 7/2014 | Key ............................... 702/136 |
| 2006/0088793 A1 | 4/2006 | Brummel et al. |
| 2010/0014555 A1 | 1/2010 | Twerdochlib |
| 2012/0098940 A1 * | 4/2012 | Zombo et al. ................... 348/47 |

\* cited by examiner

SYSTEM FOR MONITORING A HIGH-TEMPERATURE REGION OF INTEREST IN A TURBINE ENGINE

This application claims benefit of the 21 Oct. 2010 filing date, of U.S. provisional patent application No. 61/405,377, which is incorporated by reference herein. This application is related to U.S. patent application Ser. No. 13/274,766 which is filed concurrently with the present application and which is incorporated by reference herein.

FIELD OF THE INVENTION

Aspects of the invention are related to turbine engines, and, more particularly, to a system for monitoring a high-temperature region of interest, such as may be performed by way of a monitoring instrument located in an interior of a stationary vane of the turbine.

BACKGROUND OF THE INVENTION

The assignee of the present invention has successfully demonstrated apparatus and techniques for online monitoring of rotating and/or stationary components of a turbine engine. See for example, apparatus and techniques described in U.S. Pat. No. 7,690,840 titled "Method and Apparatus For Measuring Online Failure Of Turbine Thermal Barrier Components", which is herein incorporated by reference in its entirety.

In view of geometrical and thermal constraints that can arise in the context of a confined space access in a turbine engine, the thermal and/or spatial views provided by known apparatuses are generally limited to regions located radially-inward relative to cylindrical structures of the turbine. For example, obtaining thermal and/or spatial views of regions located radially-outward have not been possible or have been substantially limited in both size and/or incident angle.

Additionally, known apparatuses involve relatively long optical paths, which have generally required a relatively large number of optical elements (e.g., relay optics, etc.) since such apparatuses have been located in areas spaced-apart from the high temperatures and/or pressures that generally arise in a path of a working gas of the turbine. A long optical path may force the designer to use optical elements involving optical tradeoffs that may be needed in the context of such a long optical path, such as may involve use of optical elements having relatively low-reflection characteristics. For example, optical elements having relatively high-reflection characteristics may not be suitable in a long optical path involving a large number of such elements but may be suitable in a short optical path involving a lesser number of the optical elements. These considerations may somewhat curtail the ability of the designer to tailor the optical design to address other tradeoffs, such as an ability to use more rugged optical materials, which may have higher-reflection characteristics.

Accordingly, in view of the foregoing considerations, there continues to be a need for improved apparatus and/or techniques useful for monitoring high-temperature regions of interest in a turbine engine.

BRIEF DESCRIPTION OF THE DRAWINGS

Aspects of the invention are explained in the following description in view of the following drawings.

DETAILED DESCRIPTION OF THE INVENTION

Figure 1:
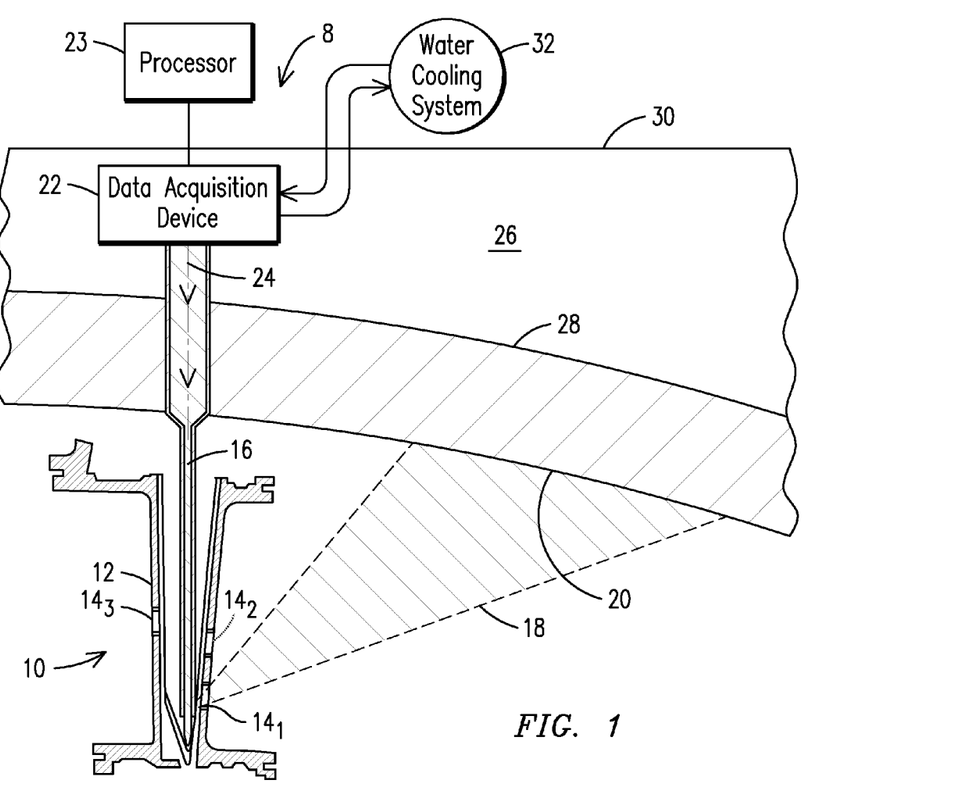
FIG. 1 in part shows a schematic representation of an example embodiment of a system as may be used for monitoring a high-temperature region of interest in a turbine engine in accordance with aspects of the present invention.

FIG. 1 in part illustrates a schematic of an example embodiment of a system 8, as may be used for online monitoring of a high-temperature region of interest 20 in a turbine engine 10, as may be utilized in land-based, marine or aeronautical applications. As will be appreciated by one skilled in the art, turbine 10 may include a number of internally-cooled (e.g., air-cooled) stationary vanes, as may be located in a path of a working gas of the turbine, and thus subject to relatively high temperatures, e.g., in the order of a few thousands degree Fahrenheit, such as about 2800° F. or more.

In accordance with aspects of the present invention, a vane 12 may be constructed to include a monitoring port $14_1$ and to accommodate in its interior a monitoring instrument 16, which is operatively connected to monitoring port $14_1$ to, for example, provide a field of view 18 of region of interest 20 remote from vane 12. It will be appreciated that aspects of the present invention are not limited to a single monitoring port $14_1$ constructed in vane 12. For example, further monitoring ports, such as monitoring ports $14_2$ and $14_3$ may be constructed in vane 12 to provide respective fields of view of further regions of interest remote from vane 12. Example turbine components that may be located in region of interest 20 may include stationary ring segments (not shown) located by the tip of a corresponding rotating blade (not shown). As will be appreciated by one skilled in the art, a thermal barrier coating (TBC) on these ring segments may experience accelerated wear and tear since they are subjected to high velocity, high temperature gases under high pressure conditions and/or hard contact with the blade tips.

In one example embodiment, system 8 includes a data acquisition device 22 coupled to monitoring instrument 16 to acquire data from the region of interest. In one example embodiment, data acquisition device 22 may be an infrared red (IR) imaging device, such as an IR camera, coupled to monitoring instrument 16 to acquire imaging data of the region of interest. In one example embodiment, a processor 23 may be operatively coupled to process imaging data from IR imaging device 22 to generate an image (spatial and/or thermal image) of the region of interest. For readers desirous of general background information in connection with example techniques for processing imaging data from an IR camera, reference is made to U.S. Pat. No. 7,690,840. Unlike pyrometer systems that commonly use a single point of the desired surface to measure temperature; a system embodying aspects of the present invention would preferably use a focal plane array sensor (e.g., an array of charged coupled devices (CCD)) to measure the emitted radiance of the entire area of the surface to be measured.

It will be appreciated that monitoring instrument 16, data acquisition device 22 and processor 23 need not be respectively limited to monitoring, acquisition and processing of imaging data since it is contemplated that monitoring instrument 16, data acquisition device 22 and processor 23 may be optionally adapted (e.g., based on the needs of a given application) to monitoring, acquisition and processing of non-imaging data, such as may involve pyrometry data, spectroscopy data, chemical composition data, vibration data, acoustic data, optical data, etc. The example description below focuses on an example imaging application and monitoring instrument 16 may be referred to as a viewing instrument. However, as noted above, such example description should not be construed in a limiting sense.

In one example embodiment, IR camera 22 may have a viewing axis 24 generally facing away from region of interest 20. For example, viewing axis 24 may face radially inwardly relative to a rotation axis of the turbine, which would be helpful for monitoring radially inwardly regions of the turbine, but would not be conducive to monitoring outwardly regions of the turbine, such as region 20. Accordingly, in accordance with aspects of the present invention, viewing instrument 16 may be configured with a suitably positioned prism or mirror assembly to provide a retroview (e.g., obliquely facing away) with respect to the radially inward direction of viewing axis 24 of the IR camera so that region of interest 20 falls within the viewing axis of the IR camera. It will be appreciated that viewing instrument 16 may be adapted to be repositionable inside vane 12, e.g., rotatable about axis 24 and/or radially movable along axis 24, to monitor alternative regions of interest, such as may be performed through monitoring ports, $14_1$ $14_2$ and $14_3$.

In one example application monitoring instrument 16 may be located to measure and/or view various chemical and/or physical indicators, such as may be obtained from a region of interest, which may be located upstream of a first row of vanes, such as may provide a view towards a combustor. These indicators may be used to determine characteristics of a combustion flow. Example indicators may be flow characteristics, chemical composition, chemical reaction dynamics, etc. Another example application feasible with a system embodying aspects of the present invention may be monitoring of blade tip clearance.

It will be appreciated that data acquired from two or more monitoring instruments may be processed to generate stereo (e.g., parallax) or 3D measurements or imaging from the region of interest, e.g., imaging data from dual viewing instruments 16 may be used for stereo imaging of the region of interest.

It will be appreciated that in one example embodiment, such dual viewing instruments may be disposed proximate to one another, (conceptually similar to the side-by-side scopes of a binocular) and may provide a partially overlapping field of view of the region of interest. It will be appreciated that the two or more viewing instruments need not be disposed proximate to one another. For example, the two or more viewing instruments may be arranged at accurately predefined spaced-apart positions to provide different perspective views of a given region of interest, which may then be processed to generate stereo or 3D measurements or imaging of the region of interest. As can be appreciated in FIG. 1, in one example embodiment IR camera 22 may be disposed in a plenum 26 defined by an inner casing 28 and an outer casing 30 of the turbine. In this example embodiment, IR camera 22 may include a water cooling system 32 since temperatures in plenum 26, although substantially cooler than the region where the hot temperature working gas operates, may be several hundred degree Fahrenheit, such as about 850° F. or more. It will be appreciated that IR imaging device 22 need not be disposed in plenum 26 since IR imaging device 22 could be located in other regions, such as outside outer casing 30 of the turbine, which would avoid a need of water cooling system 32.

Figure 2:
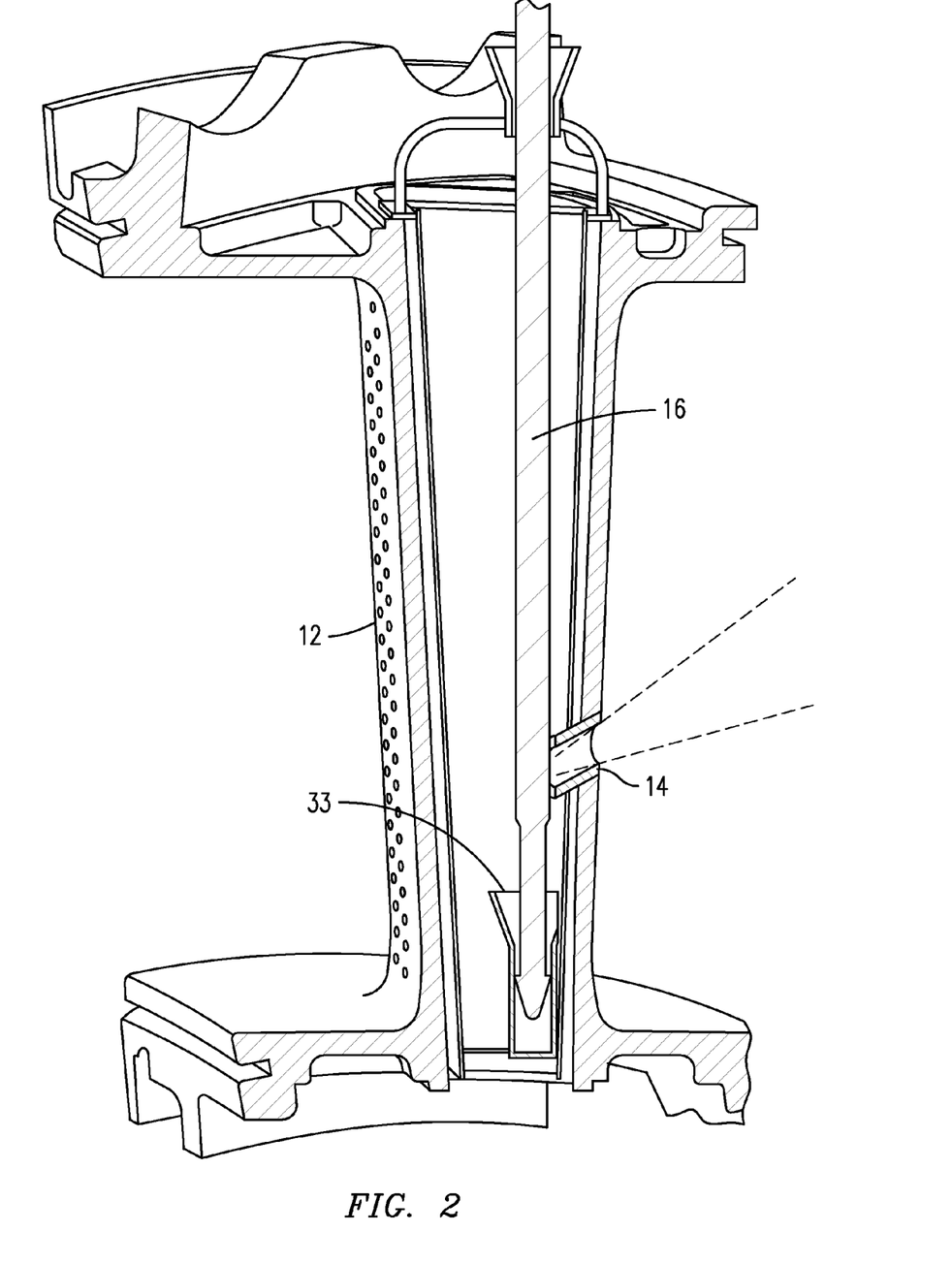
FIGS. 2-4 illustrate respective cut-away views of respective example embodiments of a stationary vane including a monitoring instrument (e.g., a viewing instrument) operatively connected to a viewing port of the stationary vane to provide a field of view of a region of interest in accordance with aspects of the present invention.
Figure 3:
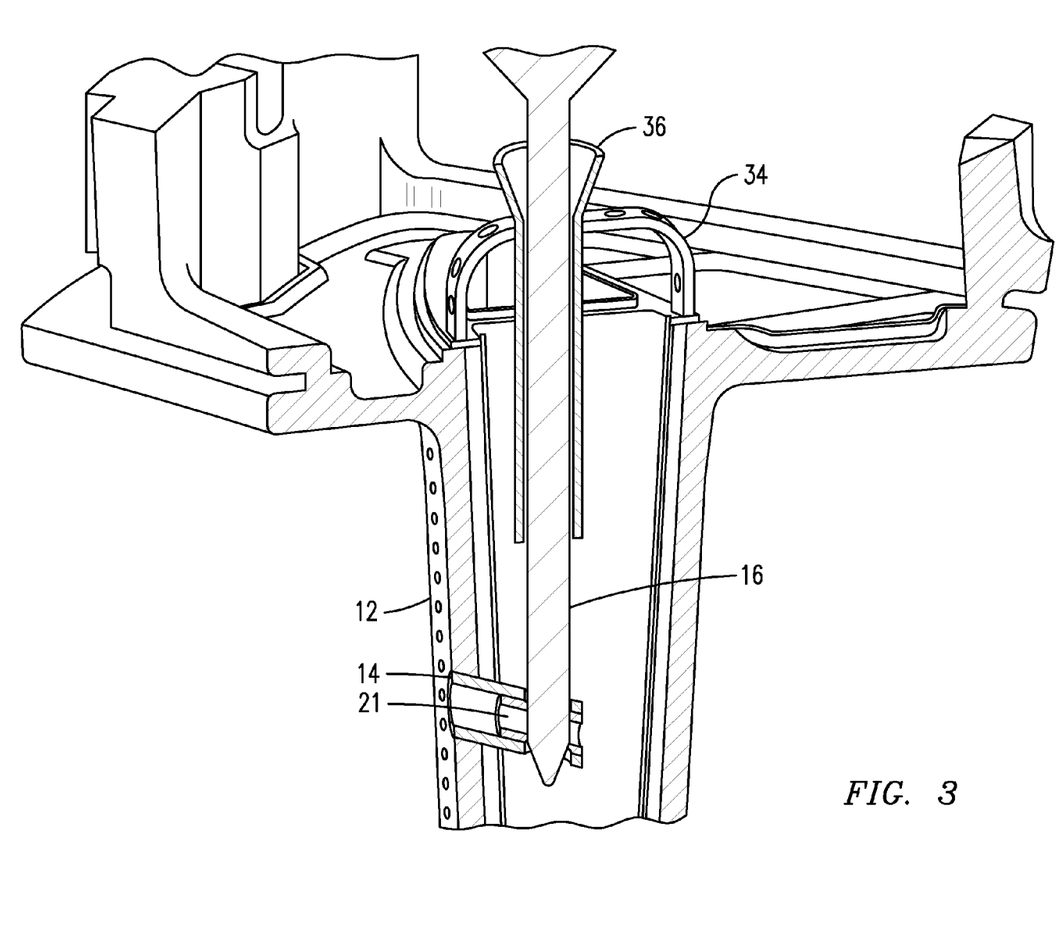

It will be appreciated by one skilled in the art that viewing instrument 16 may be securely attached in the interior of vane 12 using any of various example mounting arrangements. For example, FIG. 2 illustrates a cut-away view of vane 12, which may include a guide tube 33 configured to receive a distal end of viewing instrument 16. FIG. 3 illustrates another example arrangement for affixing viewing instrument 16, where vane 12 includes a bracket 34 connected at a proximate end of vane 12 to support a funnel tube 36 for receiving viewing instrument 16 into vane 12. As illustrated in FIG. 3, viewing port 14 may include a restrictor 21 (e.g., a boss) to limit a flow of cooling air through the viewing port of the vane.

Figure 4:
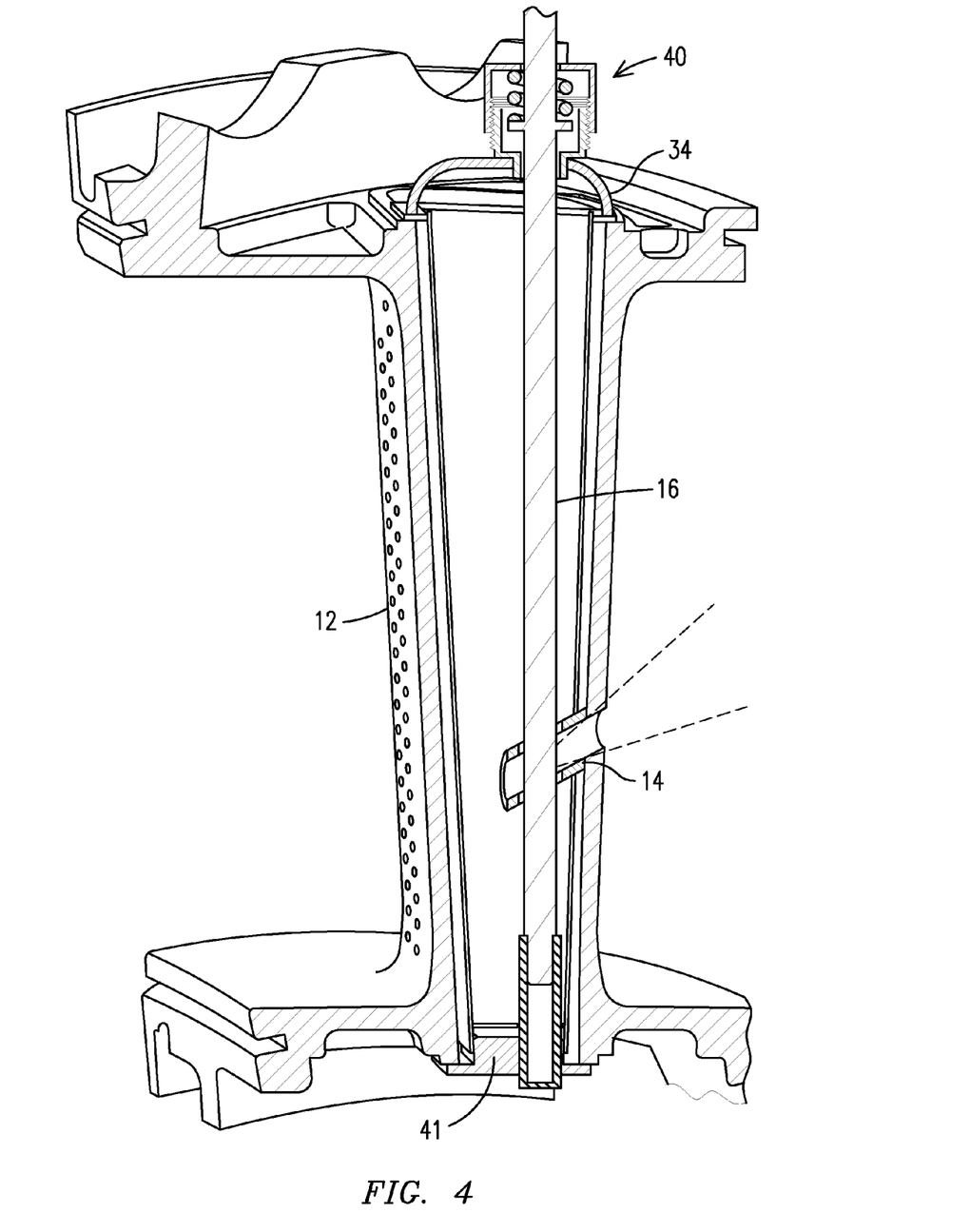

FIG. 4 illustrates an example embodiment where bracket 34 may be connected to a cap assembly 40, which may be arranged to affix viewing instrument 16 in vane 12 and provide an axial force to urge a distal end of the casing of viewing instrument 16 against a base plate 41.

Figure 5:
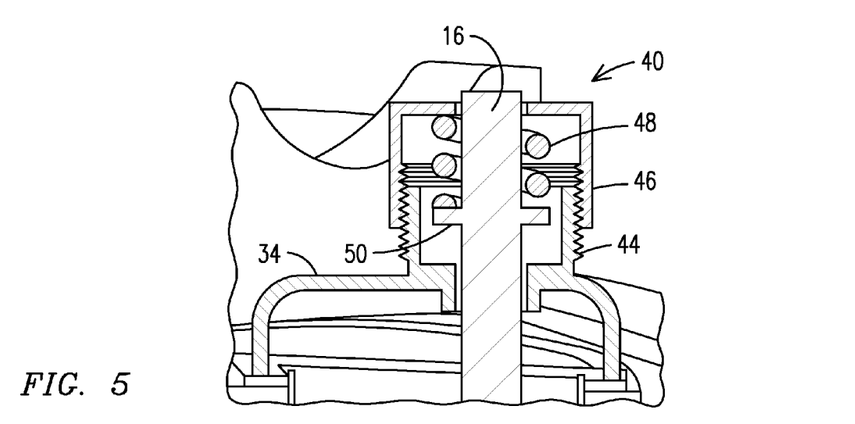
FIG. 5 is a cross-sectional view of an example embodiment of a cap assembly as may be connected to secure the viewing instrument in the vane.

As shown in further detail in FIG. 5, in one example embodiment cap assembly 40 may be made up of a male cap 44, which is connected to bracket 34 to receive a female cap 46, where caps 44 and 46 may be arranged to provide a threaded connection between one another. A spring biasing element 48 may be arranged between a flange 50 constructed in viewing instrument 16 so that when female cap 46 is tightened onto male cap 44, spring biasing element 28 provides the axial force to urge the distal end of viewing instrument 16 against base plate 41 (FIG. 4).

Figure 6:
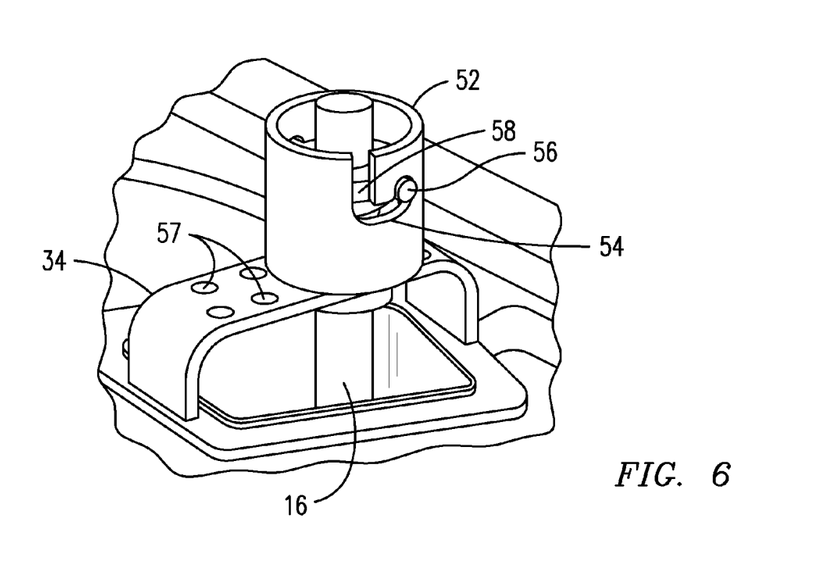
FIG. 6 is a cross-sectional view of an example embodiment of a twist-locking assembly as may be connected to secure the viewing instrument in the vane.

As shown in FIG. 6, in another example embodiment bracket 34 may include a twist locking assembly 52, which may include a locking slot 54 for receiving a locking pin 56 constructed in viewing instrument 16 and may further include a spring biasing element 58 arranged to provide the axial force to urge the distal end of viewing instrument against the bottom plate. As may be appreciated in FIG. 6, bracket 32 may include a plurality of perforations 57 to reduce blockage to the working gas that passes by the vane.

Figure 7:
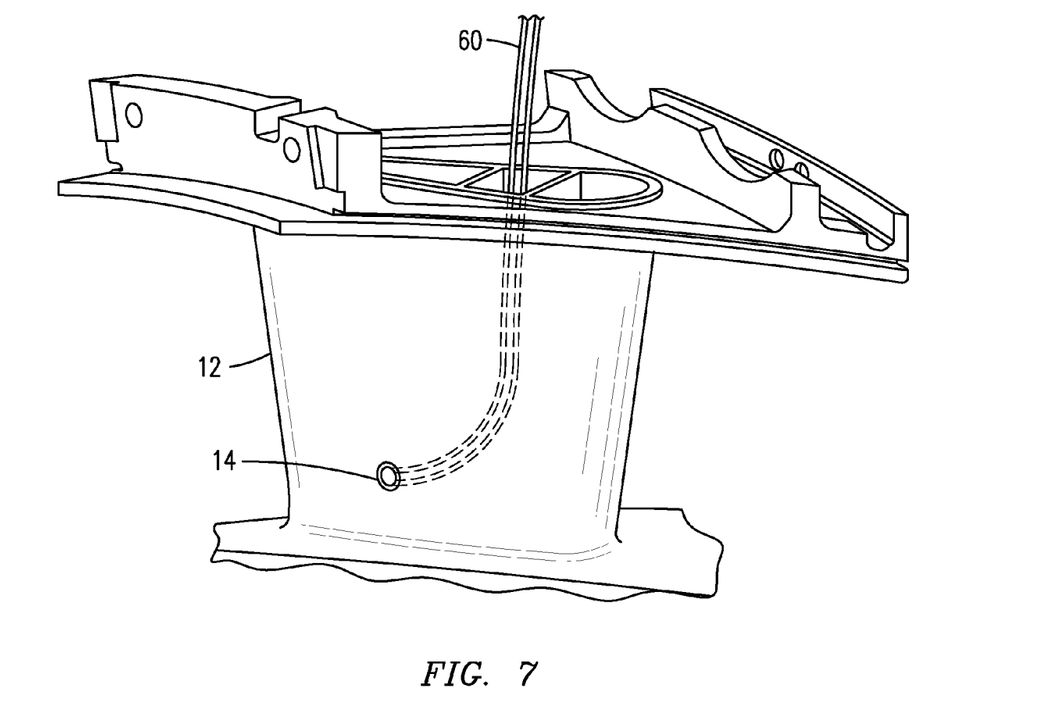
FIG. 7 is a cut-away view of an example embodiment of a viewing instrument, such as may be made up of optical fiber bundles.

It will be appreciated that viewing instrument 16 need not be limited to a rigid optics implementation (akin to the structure of a photography telephoto lens) since it is contemplated that in one example embodiment, as illustrated in FIG. 7, viewing instrument 16 may be made up of one or more optical fiber bundles 60 (akin to the structure of a flexible medical endoscope) arranged to view IR emissions from region of interest 20. It will be appreciated that this embodiment can provide optical routing flexibility, as compared to a rigid optics implementation. For example, the optical coupling between optical fiber bundle 60 and IR camera 22 (FIG. 1) provides adaptability to the designer, such as in terms of adaptability regarding the location of IR camera 22.

In operation, an electro-opto-mechanical system embodying aspects of the present invention may be configured to provide a temperature mapping and/or spatial imaging of turbine components in the region of interest. In one example embodiment, IR data may be calibrated in terms of relative or absolute temperature to generate a temperature map of turbine components in the region of interest. For example, this may allow determining whether one or more areas of such turbine components may be experiencing thermal distress. As will be appreciated by one skilled in the art, such a thermal distress may cause life reduction or damage to a given turbine component.

In operation, an electro-opto-mechanical system embodying aspects of the present invention may be configured to monitor in real-time or near real-time the temperature and condition of the region of interest. A system in accordance with aspects of the present invention innovatively may be arranged to provide retroscopic-viewing (e.g., generally backward-viewing) towards the region of interest. The system may be configured to monitor the region of interest under various operational conditions of the turbine (e.g., startup, base load, and shut down).

In one example embodiment, IR data may be processed to generate spatial imaging of turbine components in the region of interest. For example, the spatial imaging may be useful for visualization of one or more areas of such turbine components that may be experiencing physical distress. The spatial imaging may be further useful for realization of operational issues in connection with turbine components that may not be performing as expected. It will be appreciated that the thermal mapping and spatial imaging may be used in synergistic combination to obtain real-world knowledge in connection with various characteristics of turbine components in the region of interest, such as operational performance, causative factors of life reduction or damage, manufacturing defects, service caused defects, etc. It will be appreciated that data acquired by a monitoring instrument embodying aspects of the present invention may be acquired at different wavelengths. These data may then be processed to, for example, generate further characterization or quantification of temperature or other spectral measurements, such as may be used to generate multi-spectral images and/or measurements from a given region of interest.

Example aspects of the invention may include: thermal and/or spatial imaging for the examination of TBC coated components in motion or stationary; the ability to conduct quantitative measurements without interrupting or with minimal interruption of the operation of the turbine, and the ability to make essentially in real-time operating decisions in order to reduce risk and damage due to TBC failure. It will be appreciated that a system embodying aspects of the present is not limited to online operation and may be adapted to off-line operation, such as may allow nondestructive and noncontact quantitative measurements under various settings, such as new, service exposed, and service exposed repaired components while the turbine in an offline mode.

In one exemplary on-line embodiment, data indicative of measurements and/or suitable to generate images of the region of interest may be periodically monitored and tracked in near real-time operation of the turbine. It is contemplated that rapid analysis and decision systems, as may utilize expert and/or supervisory subsystems may be employed to analyze collected data and make decisions regarding the operation of the turbine. The expert and/or supervisory subsystems may include forecasting algorithms as may allow forecasting operating time available once a given faulty condition is detected. The expert and/or supervisory subsystems may be configured to allow an operator to change turbine operation conditions essentially in real time and/or interact with a supervisory controller to change the turbine operation conditions essentially in real time.

While various embodiments of the present invention have been shown and described herein, it will be apparent that such embodiments are provided by way of example only. Numerous variations, changes and substitutions may be made without departing from the invention herein. Accordingly, it is intended that the invention be limited only by the spirit and scope of the appended claims.

The invention claimed is:

1. A turbine engine comprising:
    an internally-cooled stationary vane;
    at least one monitoring port located in the stationary vane;
    a monitoring instrument operatively associated with said at least one monitoring port of the stationary vane to provide a field of view of a region of interest, wherein the monitoring instrument comprises a viewing instrument, wherein the vane includes a hollow guide tube disposed proximate an inner base of the stationary vane to receive a distal end of the viewing instrument;
    a hollow tube affixed to the stationary vane by way of a bracket connected at a proximate end of the stationary vane, the hollow tube extending through a portion of the interior of the vane and comprising a funnel-shaped entrance to receive the viewing instrument into the vane; and
    a focal plane array coupled to the viewing instrument to concurrently acquire imaging data of the region of interest.

2. The turbine engine of claim 1, wherein the focal plane array comprises an IR camera having a viewing axis facing away from the region of interest and the field of view of the viewing instrument is configured to provide a retroview with respect to the viewing axis of the IR camera so that the region of interest is within the viewing axis of the IR camera.

3. The turbine engine of claim 1, wherein the bracket connected at the proximate end of the vane is further arranged to support a cap assembly for affixing the monitoring instrument.

4. The turbine engine of claim 3, wherein the cap assembly for affixing the monitoring instrument includes a spring biasing element.

5. The turbine engine of claim 3, wherein the cap assembly comprises a male cap connected to the bracket and a female cap to be received by the male cap to provide a threaded connection between one another.

6. The turbine engine of claim 3, wherein the monitoring port comprises a restrictor to limit a flow of air through the monitoring port.

7. The turbine engine of claim 3, wherein the vane is located in a path of a working gas of the turbine engine, and further wherein the bracket comprises a plurality of perforations to reduce blockage to the working gas.

8. The turbine engine of claim 1, wherein the focal plane array comprises an IR camera disposed in a plenum defined by an inner casing and an outer casing of the turbine.

9. The turbine engine of claim 8, wherein the IR camera includes a water cooling system.

10. The turbine engine of claim 1, wherein the focal plane array comprises an IR camera disposed outside an outer casing of the turbine.

11. A system for monitoring a high-temperature region of interest in a turbine engine, the system comprising:
    an internally cooled stationary vane located in a path of a working gas of the turbine;
    at least one monitoring port located in the stationary vane;
    a monitoring instrument operatively associated with the monitoring port of the stationary vane to provide a field of view of the high-temperature region of interest in the turbine engine, wherein the monitoring instrument comprises a viewing instrument;
    a hollow funnel tube extending through a portion of the interior of the vane to receive the viewing instrument into the vane;

a focal plane array coupled to the viewing instrument to concurrently acquire imaging data of the high-temperature region of interest in the turbine engine; and a processor configured to process data from the focal plane array to generate at least a measurement of the high-temperature region of interest in the turbine engine.

12. The system of claim 11, wherein the focal plane array comprises an IR camera having a viewing axis facing away from the region of interest and the field of view of the viewing instrument is configured to provide a retroview with respect to the viewing axis of the IR camera so that the region of interest is within the viewing axis of the IR camera.

13. The system of claim 12, wherein the imaging data from the IR imaging device is processed by the processor to generate at least one of a thermal image and a spatial image of the region of interest.

14. The system of claim 11, wherein the focal plane array comprises an IR camera disposed in a plenum defined by an inner casing and an outer casing of the turbine.

15. The system of claim 14, wherein the IR camera includes a water cooling system.

16. The system of claim 11, wherein the vane includes a hollow guide tube disposed proximate an inner base of the stationary vane to receive a distal end of the viewing instrument.

* * * * *